(12) United States Patent
Kagata et al.

(10) Patent No.: US 9,994,724 B2
(45) Date of Patent: *Jun. 12, 2018

(54) INK COMPOSITION, INK SET, AND RECORDING METHOD

(71) Applicant: Seiko Epson Corporation, Tokyo (JP)

(72) Inventors: Takayoshi Kagata, Shiojiri (JP);
Masahiro Yatake, Shiojiri (JP);
Hiroshi Mukai, Shiojiri (JP)

(73) Assignee: Seiko Epson Corporation (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/335,915

(22) Filed: Oct. 27, 2016

(65) Prior Publication Data

US 2017/0044386 A1 Feb. 16, 2017

Related U.S. Application Data

(63) Continuation of application No. 14/669,569, filed on Mar. 26, 2015, now Pat. No. 9,505,940.

(30) Foreign Application Priority Data

Mar. 27, 2014 (JP) .................................. 2014-065432

(51) Int. Cl.
*C09D 11/322* (2014.01)
*C09D 11/40* (2014.01)
(Continued)

(52) U.S. Cl.
CPC ............... *C09D 11/322* (2013.01); *B41J 2/01* (2013.01); *C09D 11/023* (2013.01);
(Continued)

(58) Field of Classification Search
CPC ...... C09D 11/023; C09D 11/322; C09D 11/40
See application file for complete search history.

(56) References Cited

U.S. PATENT DOCUMENTS 5,371,148 A * 12/1994 Taylor ................... C08F 290/12
525/293
5,461,125 A * 10/1995 Lu ......................... C08F 265/04
523/201

(Continued)

FOREIGN PATENT DOCUMENTS

CN 104910686 A 9/2015
JP 09-249838 A 9/1997

(Continued)

*Primary Examiner* — Kristal Feggins
*Assistant Examiner* — Kendrick Liu
(74) *Attorney, Agent, or Firm* — Harness, Dickey & Pierce, P.L.C.

(57) ABSTRACT

An ink composition that performs recording by being attached on a heated non-absorbent recording medium or a heated low absorbency recording medium, the ink composition including a pigment; a core polymer and a shell polymer that covers at least a portion of the core polymer, and polymer particles in which the glass transition point of the polymer that configures the core polymer is more than 10° C. lower than the glass transition point of the polymer that configures the shell polymer, and in which the polymer that configures the shell polymer includes a polymer having a (meth)acrylate monomer unit and a carboxylic acid monomer unit, and the content of the polymer particles is 3.0 mass % or more with respect to the total amount of the ink composition.

16 Claims, 1 Drawing Sheet

(51) Int. Cl.
  *C09D 11/023* (2014.01)
  *C09D 11/107* (2014.01)
  *C09D 11/30* (2014.01)
  *C09D 11/106* (2014.01)
  *B41J 2/01* (2006.01)

(52) U.S. Cl.
  CPC .......... *C09D 11/106* (2013.01); *C09D 11/107* (2013.01); *C09D 11/30* (2013.01); *C09D 11/40* (2013.01)

(56) References Cited

U.S. PATENT DOCUMENTS

| | | | |
|---|---|---|---|
| 5,814,685 A | 9/1998 | Satake et al. | |
| 5,872,189 A | 2/1999 | Bett et al. | |
| 5,997,136 A | 12/1999 | Fujisawa et al. | |
| 6,203,973 B1* | 3/2001 | Chen | C08F 265/06 430/627 |
| 9,039,130 B2 | 5/2015 | Yatake | |
| 9,505,940 B2* | 11/2016 | Kagata | C09D 11/107 |
| 2003/0008938 A1 | 1/2003 | Sano et al. | |
| 2004/0059022 A1 | 3/2004 | Tsukiyama et al. | |
| 2004/0131855 A1 | 7/2004 | Ganapathiappan | |
| 2004/0171718 A1* | 9/2004 | Nakamura | C09D 11/40 523/160 |
| 2005/0174408 A1 | 8/2005 | Qingguo et al. | |
| 2009/0041942 A1* | 2/2009 | Hayashi | B05D 5/068 427/385.5 |
| 2010/0092675 A1 | 4/2010 | Aoki | |
| 2010/0261833 A1* | 10/2010 | Ghosh | C08F 257/02 524/525 |
| 2010/0328411 A1* | 12/2010 | Ganapathiappan | B41M 7/009 347/102 |
| 2011/0234727 A1 | 9/2011 | Aoki et al. | |
| 2011/0318551 A1* | 12/2011 | Nakagawa | B01J 13/02 428/206 |
| 2012/0038719 A1 | 2/2012 | Shimizu et al. | |
| 2012/0050388 A1 | 3/2012 | Nishiguchi et al. | |
| 2014/0160211 A1 | 6/2014 | Aoki | |
| 2015/0252200 A1 | 9/2015 | Kagata et al. | |

FOREIGN PATENT DOCUMENTS

| | | |
|---|---|---|
| JP | 2002-012802 A | 1/2002 |
| JP | 2002-030235 A | 1/2002 |
| JP | 2004-211089 A | 7/2004 |
| JP | 2005-219483 A | 8/2005 |
| JP | 2006-045304 A | 2/2006 |
| JP | 2010-047700 A | 3/2010 |
| JP | 2010-094809 A | 4/2010 |
| JP | 2011-201228 A | 10/2011 |
| JP | 2012-025947 A | 2/2012 |
| JP | 2012-051309 A | 3/2012 |
| JP | 2012-072354 A | 4/2012 |
| JP | 2012-092224 A | 5/2012 |
| JP | 2013-060565 A | 4/2013 |
| JP | 2015-101689 A | 6/2015 |

* cited by examiner

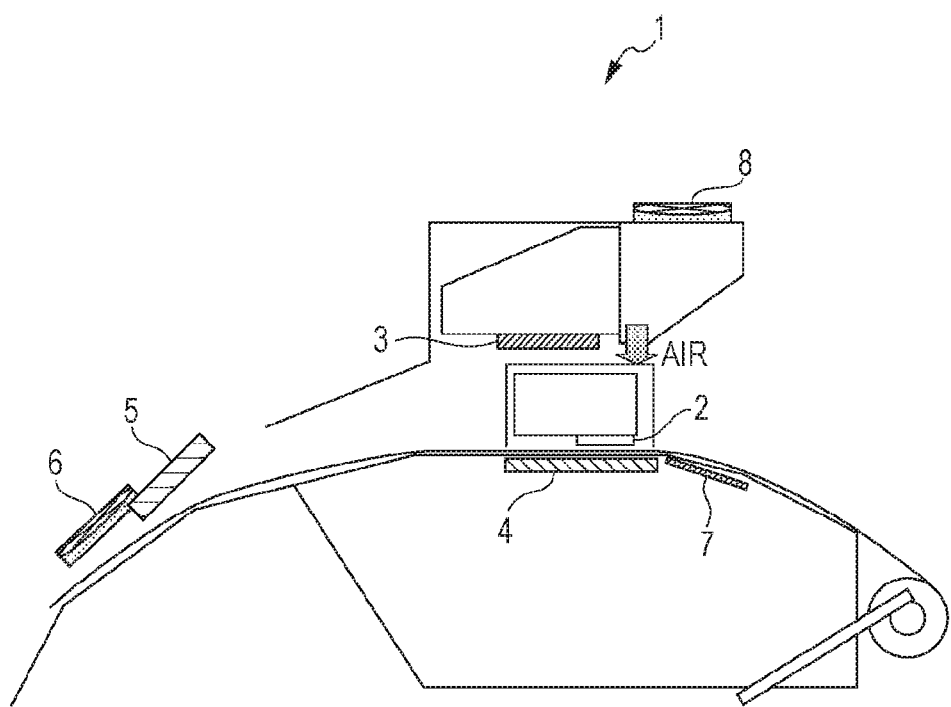

INK COMPOSITION, INK SET, AND RECORDING METHOD

CROSS-REFERENCE TO RELATED APPLICATIONS

This application is a continuation of U.S. patent application Ser. No. 14/669,569, filed Mar. 26, 2015, which claims priority to Japanese Patent Application No. 2014-065432, filed Mar. 27, 2014, both of which are hereby expressly incorporated by reference herein in their entireties.

BACKGROUND

1. Technical Field

The present invention relates to an ink composition, an ink set, and a recording method.

2. Related Art

The ink jet recording method is able to record high definition images with a comparatively simple device, and rapid development has been made on various fronts. Among these, clogging or the like of ink jet nozzles has been variously researched. JP-A-9-249838 discloses providing a pigment type aqueous ink jet recording liquid that provides the characteristics demanded as an ink jet recording liquid, in particular excellent waterproofness, light resistance, resolution, and stable discharge, without clogging of the nozzles, and discloses an ink jet recording liquid in which a pigment and a resin are dispersed in an aqueous medium, where the resin is an aqueous emulsion formed from a gel formed from a polymer with a glass transition point of 50° C. to 150° C. and a core formed from a polymer with a glass transition point of −100° C. to 40° C.

However, JP-A-9-249838 does not disclose a difference between the glass transition temperatures of the core polymer and the shell polymer. The ink composition disclosed in JP-A-9-249838 has 0.8 mass % of a pigment content (solid content conversion) and the content of the polymer particles in relation thereto is a comparatively small 2 mass % to 4 mass %. However, in a case where the content of the pigment is comparatively large, the resin ordinarily used also increases, thereby increasing the viscosity of the ink composition. In so doing, it is likely to occur clogging of the nozzles. In particular, a problem arises of recovery from clogging becoming impossible.

SUMMARY

An advantage of some aspects of the invention is to provide an ink composition for which recovery from nozzle clogging (below, referred to as "clogging recovery") is easy even in a case of using an ink composition with a comparatively low content of pigment or an ink composition with a comparatively high content of pigment, an ink set provided with the ink composition, and a recording method using the ink composition and the ink set.

The inventors have conducted intensive research in order to solve the above problems. As a result, it was discovered that it is possible to solve the problem by using predetermined polymer particles, thereby completing invention.

That is, the invention is as follows.

(1) According to an aspect of the invention, there is provided an ink composition that performs recording by being attached on a heated non-absorbent recording medium or a heated low absorbency recording medium, the ink composition including a pigment; and polymer particles, in which the polymer particles include a core polymer and a shell polymer that covers at least a portion of the core polymer, a glass transition point of the polymer that configures the core polymer is more than 10° C. lower than the glass transition point of the polymer that configures the shell polymer, the polymer that configures the shell polymer includes a polymer having a (meth)acrylate monomer unit and a carboxylic acid monomer unit, and the content (solid content conversion) of the polymer particles is 3.0 mass % or more with respect to the total amount of the ink composition.

(2) In the ink composition according to (1), it is preferable that the polymer that configures the shell polymer includes 20 mass % or more of a repeating unit derived from a hydrophilic monomer, and includes 10 mass % or more of a repeating unit derived from a hydrophobic monomer.

(3) In the ink composition according (1) or (2), it is preferable that glass transition point of the polymer that configures the core polymer is −10° C. or higher to 60° C. or lower.

(4) In the ink composition according to any one of (1) to (3), it is preferable that the content of the (meth)acrylate monomer unit and the carboxylic acid monomer unit in the polymer that configures the shell polymer is 30 mass % or more with respect to the total amount of the polymer that configures the shell polymer.

(5) In the ink composition according to any one of (1) to (4), it is preferable that the glass transition point of the polymer that configures the shell polymer is higher than 40° C.

(6) In the ink composition according to any one of (1) to (5), it is preferable that a mass ratio (c/s) of the mass of the core polymer (c) and the mass of the shell polymer (s) is 0.40 to 4.0, and the ratio ((c/s)/φ) of the average particle diameter φ (unit: nm) of the polymer particles and the mass ratio (c/s) is 0.010 or more.

(7) In the ink composition according to any one of (1) to (6), it is preferable that the content of the polymer particles is 3.0 mass % or more to 20 mass % or less with respect to the total amount of the ink composition.

(8) In the ink composition according to any one of (1) to (7), it is preferable that the acid value of the polymer that configures the core polymer is 0 mgKOH/g, and the acid value of the polymer that configures the shell polymer is 20 mgKOH/g.

(9) In the ink composition according to any one of (1) to (8), it is preferable that the polymer that configures the core polymer includes 80 mass % or more of a polymer having a hydrophobic monomer unit, and the polymer that configures the shell polymer includes a polymer having a methyl (meth)acrylate monomer unit or an ethyl (meth)acrylate monomer unit.

(10) In the ink composition according to any one of (1) to (9), it is preferable that the gel fraction due to tetrahydrofuran of the polymer that configures the core polymer and the polymer that configures the shell polymer is 10% or less.

(11) In the ink composition according to any one of (1) to (10), it is preferable that the content of the pigment is less than 0.8 mass % with respect to the total amount of the ink composition.

(12) According to an aspect of the invention, there is provided an ink set including a light ink composition that is the ink composition according to any one of (1) to (10), in which the content of pigment included in the ink composition is less than 0.8 mass % with respect to the total amount of the ink composition, and a dark ink composition that is the ink composition according to any one of (1) to (10), in which the content of the pigment included in the ink composition is 0.8 mass % or more with respect to the total amount of the ink composition.

(13) According to an aspect of the invention, there is provided a recording method including heating a non-absorbent recording medium or a low-absorbency recording medium, and discharging the ink composition according to any one of (1) to (11) or the light ink composition or dark ink composition that configure the ink set according to (12) and attaching the ink composition on the non-absorbent recording medium or low absorbency recording medium.

BRIEF DESCRIPTION OF THE DRAWING

The invention will be described with reference to the accompanying drawings, wherein like numbers reference like elements.

FIG. 1 is a schematic cross-sectional view showing the configuration of a recording apparatus according to the embodiment.

DESCRIPTION OF EXEMPLARY EMBODIMENTS

Below, although forms (below, referred to as embodiments) for carrying out the invention are described in detail while referring to the drawings as necessary, the invention is not limited thereto, and various modifications are possible in a range not departing therefrom. In the drawings, like elements are given like references, and overlapping explanation thereof will not be provided. Unless otherwise noted, the position relationship, such as up, down, left, and right, are based on the positional relationships shown in the drawings. Furthermore, the dimensions and ratios in the drawings are not limited to the ratios in the drawings. The wording "(meth)acrylic" in the description signifies "acrylic" and "methacrylic" corresponding thereto, and the wording "(meth)acrylate" signifies "acrylate" and "methacrylate" corresponding thereto.

Ink Composition

The ink composition of the embodiment is an ink composition for performing recording by being attached on a heated non-absorbent recording medium or a heated low absorbency recording medium, and includes a pigment; and polymer particles, in which the polymer particles include a core polymer and a shell polymer that covers at least a portion of the core polymer, the glass transition point of the polymer that configures the core polymer (below, referred to as "Tg") is more than 10° C. lower than the glass transition point of the polymer that configures the shell polymer, the polymer that configures the shell polymer includes a polymer having a (meth)acrylate monomer unit and a carboxylic acid monomer unit, and the content (solid content conversion) of the polymer particles is 3.0 mass % or more with respect to the total amount of the ink composition.

In the related art, the polymer content in a light ink composition in which the content of pigment is comparatively low can be reduced to be comparatively low. However, in a case where the polymer content is increased from the viewpoint of the abrasion resistance being further improved, there is a problem where a lowering of the clogging recovery accompanies improvement of the abrasion resistance.

The dark ink composition in which the pigment content is comparatively high tends to also have a comparatively high resin content from the viewpoint of ensuring abrasion resistance. However, because the viscosity of the ink composition also increases accompanying an increase in the resin content, the clogging recovery tends to decrease.

That is, in the case of either the light ink composition or the dark ink composition, an ink composition with excellent clogging recovery while ensuring abrasion resistance is desired. On this point, the ink composition of the embodiment is able to suppress a rise in the viscosity, even in cases where the content of the resin by which the pigment is fixed is increased, by using the predetermined polymer particles. In so doing, in the case of either the light ink composition or the dark ink composition, it is possible to provide an ink composition with excellent clogging recovery while ensuring abrasion resistance.

Pigments

Although not particularly limited, examples of the pigment include the following pigments for each color of the ink composition.

Examples of the carbon black used in the black ink include No. 2300, No. 900, MCF 88, No. 33, No. 40, No. 45, No. 52, MA7, MA8, MA100, No. 2200B and the like (all manufactured by Mitsubishi Chemical Corporation); Raven 5750, Raven 5250, Raven 5000, Raven 3500, Raven 1255, Raven 700 and the like (all manufactured by Carbon Columbia Co., Ltd.); Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (manufactured by Cabot Japan K.K.); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa AG).

Examples of the pigment used in the white ink included C.I. Pigment White 6, 18, and 21.

Examples of the pigment used in the yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in the magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50.

Examples of the pigment used in the cyan ink include C.I. Pigment Blue 1, 2, 3, 15, 15:1, 15:2, 15:3, 15:34, 15:4, 16, 18, 22, 25, 60, 65, and 66, and C.I. Vat Blue 4, and 60.

Examples of pigments other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Although not particularly limited, examples of the white pigment include white inorganic pigments such as titanium oxide, zinc oxide, zinc sulfide, antimony oxide, and zirconium oxide. In addition to the white inorganic pigments, it is possible to use white organic particles, such as white hollow resin particles and polymer particles.

The pigments are preferably used singly, or two or more types are preferably used together.

It is preferable that the average particle diameter of the pigment is 50 nm to 500 nm, 60 nm to 400 nm is more preferable, and 70 nm to 350 nm is still more preferable. The light resistance tends to improve due to the particle size being 50 nm or higher. Precipitation tends to become slower due to the particle size being 500 nm or less. The precipitation capacity and the light resistance tend to be superior due to the average particle diameter of the pigment being within the above range. The average particle diameter of the pigment indicates the volumetric average particle diameter able to be obtained by a dynamic light scattering method.

In the description, an ink composition with a content of the pigment of less than 0.8 mass % is referred to as a "light ink composition". It is preferable that the content of the pigment in the light ink composition is 1.0 mass % or less with respect to the total amount of the ink composition, 0.7 mass % or less is more preferable, and 0.5 mass % or less is still more preferable. Even in the case of such a light ink composition, the abrasion resistance of the obtained recording material and recovery from clogging tend to be superior by using the polymer particles described later.

In the description, an ink composition with a content of the pigment of 0.8 mass % or more is referred to as a "dark ink composition". It is preferable that the content of the pigment in the dark ink composition is 0.8 mass % or more with respect to the total amount of the ink composition, 1.0 mass % or more is more preferable, and 1.5 mass % or more is still more preferable. Even in the case of such a dark ink composition, by using the polymer particles described later, the abrasion resistance of the obtained recording material is excellent and there is a tendency for the ink composition to not easily clog the nozzles.

Below, the expression "the polymer that configures the core polymer or shell polymer includes (or has) XXX polymer" is used. However, this expression does not exclude cases where the core polymer or shell polymer is configured by one type of polymer.

Polymer Particles

The polymer particles include a core polymer and a shell polymer that covers at least a portion of the core polymer, and the glass transition point of the polymer that configures the core polymer is more than 10° C. lower than the glass transition point of the polymer that configures the shell polymer. Through the glass transition point of the polymer that configures the core polymer being more than 10° C. lower than the glass transition point of the polymer that configures the shell polymer, it is possible to prevent the mixing of the two and to create functional isolation. As a result, it is possible for the abrasion resistance of the image recorded on the recording medium and the discharge stability to be further improved. It is preferable that, by making the glass transition point (Tgc) of the polymer that configures the core polymer more than 15° C. lower than the glass transition point (Tgs) of the polymer that configures the shell polymer (Tgc<Tgs−15° C.), because the core polymer with the lower Tg flows out after the shell polymer is softened by heating after discharge, the adhesiveness of the ink composition with respect to the recording medium is further improved. It is more preferable that, by making the glass transition point of the polymer that configures the shell polymer more than 15° C. higher than the glass transition point of the polymer that configures the core polymer, because it becomes difficult for the ink composition that includes the polymer particles to become attached inside the recording head, the discharge stability is improved, and is preferable.

The content of the polymer particles (solid content conversion) is 2.0 mass % or more with respect to the total amount of the ink composition, and 2.5 mass % or more is more preferable, and 3.0 mass % or more is still more preferable. By the content of the polymer particles being 3.0 mass % or more, the abrasion resistance of the obtained recording material is improved, meanwhile, it is possible for the rise in viscosity of the ink composition to be suppressed to be comparatively low. It is preferable that the content of the polymer particles is 20 mass % or less, 15 mass % or less is more preferable, and 10 mass % or less is still more preferable. By the content of the polymer particles being 20 mass % or less, the clogging properties when the printer is left tend to further improve.

Core Polymer

The polymer that configures the core polymer is preferably a homopolymer or is preferably a copolymer. It is preferable that the glass-transition temperature of the polymer that configures the core portion is −10° C. or higher to 60° C. or lower. By the glass-transition temperature of the core polymer being 60° C. or lower, because it is possible for the core polymer to easily flow out after the shell polymer is softened, the adhesiveness is excellent. By the glass-transition temperature of the core polymer being −10° C. or higher, the storage stability of the ink composition is excellent. It is preferable that the glass-transition temperature of the core polymer is 25° C. or higher and less than 60° C., and 30° C. or higher to 55° C. or lower is more preferable.

In a case where the polymer that configures the core polymer is a homopolymer, it is possible to use one in which the Tg of the homopolymer is disclosed in various documents (for example, a polymer handbook or the like). In a case where the polymer that configures the core polymer is a co-polymer, it is possible to calculate the Tg of the core polymer from the $Tg_n$ (unit: K) of the various homopolymers and the mass fraction ($W_n$) of the monomer using the FOX formula below.

$$\frac{1}{Tg} = \frac{W_1}{Tg_1} + \frac{W_2}{Tg_2} + \cdots + \frac{W_n}{Tg_n} \qquad \text{Formula 1}$$

$W_n$: mass fraction of each monomer
$Tg_n$: Tg of homopolymer of each monomer (unit: K)
Tg: Tg of the copolymer (unit: K)

Although not particularly limited, examples of the homopolymer include 2-ethylhexyl acrylate homopolymer (Tg: −70° C.), 2-ethylhexyl methacrylate homopolymer (Tg: −10° C.), 2-hydroxyethyl acrylate homopolymer (Tg: −15° C.), 2-hydroxyethyl methacrylate homopolymer (Tg: 55° C.), 2-hydroxy-butyl acrylate homopolymer (Tg: −7° C.), 2-hydroxy-butyl methacrylate homopolymer (Tg: 26° C.), 2-methoxyethyl acrylate homopolymer (Tg: −50° C.), 4-hydroxybutyl acrylate homopolymer (Tg: −80° C.), iso-octyl methacrylate homopolymer (Tg: −45° C.), iso-butyl acrylate homopolymer (Tg: 43° C.), iso-butyl methacrylate homopolymer (Tg: 53° C.), iso-propyl acrylate homopolymer (Tg: −3° C.), iso-propyl methacrylate homopolymer (Tg: 81° C.), N, N-diethylaminoethyl methacrylate homopolymer (Tg: 20° C.), N, N-dimethylaminoethyl acrylate homopolymer (Tg: 18° C.), N, N-dimethylaminoethyl methacrylate homopolymer (Tg: 18° C.), N, N-dimethylaminopropyl acrylamide homopolymer (Tg: 134° C.), n-butyl acrylate homopolymer (Tg: −54° C.), tert-butyl acrylate homopolymer (Tg: 43° C.), tert-butyl methacrylate homopolymer (Tg: 20° C.), acrylamide homopolymer (Tg: 179° C.), acrylic acid homopolymer (Tg: 106° C.), acrylonitrile homopolymer (Tg: 125° C.), isoamyl acrylate homopolymer (Tg: −45° C.), isobutyl acrylate homopolymer (Tg: −26° C.), isobutyl methacrylate homopolymer (Tg: 48° C.), isobornyl acrylate homopolymer (Tg: 94° C.), isobornyl methacrylate homopolymer (Tg: 155° C. to 180° C.), itaconic acid homopolymer (Tg: 100° C.), ethyl acrylate homopolymer (Tg: −22° C. to −24° C.), ethylcarbitol acrylate homopolymer (Tg: −67° C.), ethyl methacrylate homopolymer (Tg: 65° C.), ethoxyethyl acrylate homopolymer (Tg: −50° C.), ethoxy ethyl methacrylate homopolymer (Tg: 15° C.), ethoxy diethylene glycol acrylate homopolymer (Tg: −70° C.), octyl acrylate homopolymer (Tg: −65° C.), iso-octyl acrylate homopolymer (Tg: −70° C.), cyclohexyl acrylate homopolymer (Tg: 15° C. to 19° C.), cyclohexyl methacrylate homopolymer (Tg: 66° C. to 83° C.), dicyclopentanyl acrylate homopolymer (Tg: 120° C.), dicyclopentanyl methacrylate homopolymer (Tg: 175° C.), styrene homopolymer (Tg: 100° C.), stearyl acrylate homopolymer (Tg: 35° C.), tertiary butyl acrylate homopolymer (Tg: 41° C.), tertiary butyl methacrylate homopolymer (Tg: 107° C.), tetradecyl acrylate homopolymer (Tg: 24° C.), tetradecyl methacrylate homopolymer (Tg: −72° C.), tetrahydrofurfuryl acrylate homopolymer (Tg: −12° C.), tetrahydrofurfuryl methacrylate homopolymer (Tg: 60° C.), nonyl acrylate homopolymer (Tg: 58° C.), phenoxyethyl acrylate homopolymer (Tg: −22° C.), phenoxy ethyl methacrylate homopolymer (Tg: 54° C.), butyl acrylate homopolymer (Tg: −56° C.), butyl methacrylate homopolymer (Tg: 20° C.), propyl acrylate homopolymer (Tg: 3° C.), propyl methacrylate homopolymer (Tg: 35° C.), hexadecyl acrylate homopolymer (Tg: 35° C.), hexadecyl methacrylate homopolymer (Tg: 15° C.), hexyl acrylate homopolymer (Tg: −57° C.), hexyl methacrylate homopolymer (Tg: −5° C., benzyl acrylate homopolymer (Tg: 6° C.), benzyl methacrylate homopolymer (Tg: 54° C.), pentyl acrylate homopolymer (Tg: 22° C.), pentyl methacrylate homopolymer (Tg: −5° C.), maleic acid homopolymer (Tg: 130° C.), methacrylic acid homopolymer (Tg: 185° C.), carboxyethyl acrylate homopolymer (Tg: 37° C.), methyl acrylate homopolymer (Tg: 8° C.), methyl methacrylate homopolymer (Tg: 105° C.), methoxyethyl acrylate homopolymer (Tg: −50° C.), methoxy methacrylate homopolymer (Tg: −16° C.), lauryl acrylate homopolymer (Tg: 10° C.), lauryl methacrylate homopolymer (Tg: −65° C.), and vinyl acetate homopolymer (Tg: 32° C.). Because there are cases where the Tg differs according to the method of manufacturing or the stereoregularity of the homopolymer, there is no limitation to the above.

It is possible to control the Tg of the polymer that configures the core polymer by selecting the homopolymer in cases where the polymer is a homopolymer. In cases where the polymer is a copolymer, control is possible by taking the Tg of the homopolymer and the FOX formula above into consideration.

Although not particularly limited, preferable examples of the polymer that configures the core polymer include polymers having at least a hydrophilic (meth)acrylate monomer unit, a hydrophobic (meth)acrylate monomer unit having an alkyl group with 3 or more carbon atoms, a hydrophobic (meth)acrylate monomer unit having a ring structure, a (meth)acrylamide monomer unit or an N-substituted derivative thereof, an aromatic vinyl compound monomer unit, and a carboxylic acid monomer unit. Among these, a hydrophobic (meth)acrylate having an alkyl group with 3 or more carbon atoms and a polymer having an aromatic vinyl compound are preferable.

Although not particularly limited, examples of the hydrophilic (meth)acrylate monomer include methyl (meth)acrylate, ethyl (meth)acrylate, α-hydroxymethyl (meth)acrylate, 2-hydroxyethyl (meth)acrylate, (poly) ethylene glycol (meth)acrylate, methoxy (poly) ethylene glycol (meth)acrylate, ethoxy (poly) ethylene glycol (meth)acrylate, and (poly) propylene glycol (meth)acrylate. Among these, methyl (meth)acrylate and ethyl (meth)acrylate are preferable. Here, the wording "hydrophilic" indicates the solubility with respect to 100 mL of water (20° C.) is 0.3 g or more.

Although not particularly limited, examples of the hydrophobic(meth)acrylate monomer having an alkyl group with or more carbon atoms include (meth)acrylates having an alkyl group with 3 or more carbon atoms such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, and behenyl (meth)acrylate. Among these, lauryl (meth)acrylate is preferable. Here, the wording "hydrophobic" indicates the solubility with respect to 100 mL of water (20° C.) is less than 0.3 g.

Although not particularly limited, examples of the hydrophobic (meth)acrylate monomer having a ring structure include cyclohexyl (meth)acrylate, dicyclopentanyl (meth)acrylate, dicyclopentanyl (meth)acrylate, dicyclopentanyl oxyethyl (meth)acrylate, isobornyl (meth)acrylate, norbornyl (meth)acrylate, adamantyl (meth)acrylate, and tetrahydrofurfuryl (meth)acrylate.

Although not particularly limited, examples of the (meth)acrylamide monomer or N-substituted derivatives thereof include (meth)acrylamide, N-hydroxymethyl(meth)acrylamide, diacetone acrylamide, and N,N-dimethyl acryl(meth)amide.

Although not particularly limited, examples of the aromatic vinyl compound monomer include styrene, α-methylstyrene, p-methylstyrene, vinyl toluene, chlorostyrene, and divinylbenzene.

Although not particularly limited, examples of the carboxylic acid monomer include (meth)acrylic acid, crotonic acid, maleic acid, fumaric acid, and itaconic acid. Among these, (meth)acrylic acid is preferable. Here, the wording "carboxylic acid monomer" refers to a polymerizable monomer having a carboxyl group and a polymerizable unsaturated group.

These monomers are preferably used singly, or two or more types are preferably used together.

It is preferable that the content of the hydrophobic monomer unit from all units that configure the polymer that configures the core polymer is 80 mass % or more, and 90 mass % or more is more preferable. By the content of the hydrophobic monomer unit being in the above range, because a hydrophobic film is formed on the surface of the image recorded on the recording medium by performing heat treatment or the like, the abrasion resistance of the recording material tends to further improve.

Although not particularly limited, preferable examples of the polymer that configures the core polymer include polymers having only hydrophobic monomer units. By the polymer that configures the core polymer including a polymer having only hydrophobic monomer units, the abrasion resistance tends to further increase since a hydrophobic film is formed on the surface of the image recorded on the recording medium. Although not particularly limited, examples of hydrophobic monomer include a hydrophobic (meth)acrylate monomer having an alkyl group with 3 or more carbon atoms and a hydrophobic (meth)acrylate monomer having a ring structure.

It is preferable that the acid value of the polymer that configures the core polymer is 0 KOH/g to 30 KOH/g, 0 KOH/g to 10 KOH/g is more preferable, and 0 mgKOH/g is still more preferable. By the acid value of the polymer that configures the core polymer being 30 mgKOH/g or less, the abrasion resistance tends to further increase since a hydrophobic film is formed on the surface of the image recorded on the recording medium.

It is preferable to design the core polymer so as to be a polymer with a high hydrophobicity. Therefore, a core polymer without an acid value is most preferable. It is preferable that the core polymer includes at least an aromatic vinyl compound monomer as a constituent unit. In so doing, the core polymer becomes hydrophobic and it is possible to form a hydrophobic film. As a result, it is possible to improve the water and friction resistance that is one abrasion resistance in the recorded image.

Shell Polymer

The polymer that configures the shell polymer includes a polymer having a (meth)acrylate monomer unit and a carboxylic acid monomer unit. By the polymer that configures the shell polymer including a polymer having a (meth)acrylate monomer unit and a carboxylic acid monomer unit, it is possible for a carboxyl group to be present in the surface of the shell polymer. In so doing, the dispersion stability of the polymer particles further improves, and because the viscosity of the ink composition becomes comparatively low, the discharge stability further improves. Although not particularly limited, examples of the (meth)acrylate monomer unit include a hydrophilic (meth)acrylate monomer unit (for example, a (meth)acrylate monomer unit having a alkyl group with one or two carbon atoms), a hydrophobic (meth)acrylate monomer unit having an alkyl group with 3 or more carbon atoms, and a hydrophobic (meth)acrylate monomer unit having a ring structure. Specific examples of the (meth)acrylate monomer unit and the carboxylic acid monomer unit include the ones described above for the monomer unit that configures polymer that configures the core polymer, and these monomers are preferably used singly, or two or more types are preferably used together.

It is preferable that the polymer that configures the shell polymer includes a polymer having a methyl (meth)acrylate monomer unit or an ethyl (meth)acrylate monomer unit. By including a polymer having a methyl (meth)acrylate monomer unit or ethyl (meth)acrylate monomer unit, the recovery of the printer from clogging tends to further improve.

Although not particularly limited, examples of other polymers that configure the shell polymer include (meth)acrylamide monomers or N-substituted derivatives thereof, acrylic polyols, and cyanoacrylates.

It is preferable that the repeating unit derived from (meth)acrylic acid ester and unsaturated carboxylic acid from all the repeating units that configure the polymer included in the shell polymer is 20 mass % or more, 30 mass % or more is more preferable, and 35 mass % or more is still more preferable.

It is preferable that the repeating unit derived from a hydrophilic monomer from all the repeating units that configure the polymer included in the shell polymer is 20 mass % or more, 30 mass % or more is more preferable, and 35 mass % or more is still more preferable. By the content of the repeating unit derived from a hydrophilic monomer being in the above range, since the affinity of the polymer with respect to water improving, the dispersion stability of the polymer particles in the ink composition tends to improve. Since it is possible to more effectively suppress adhering of the polymer particles to the nozzle, the discharge stability from the nozzles of the recording head to be more favorable.

It is preferable that the repeating unit derived from a hydrophobic monomer from all the repeating units that configure the polymer included in the shell polymer is 10 mass % or more, 20 mass % or more is more preferable, and 30 mass % or more is still more preferable. By the content of the repeating unit derived from a hydrophobic monomer being in the above range, even in cases where the drying of the water increases and the occupancy ratio of the organic solvent increases in the recording head and on the recording medium, the dispersion of the polymer particles tends to be stable, and suppression of aggregation of the polymer particles to themselves tends to be possible. It is preferable that the hydrophobic monomer is an aromatic vinyl monomer.

It is preferable that the glass transition point of the polymer that configures the shell polymer is 100° C. or lower, 90° C. or lower is more preferable, and 80° C. or lower is still more preferable. By the glass-transition temperature of the core polymer being 90° C. or lower, because the shell polymer is easily softened on the recording medium and the core polymer easily flows out, the adhesiveness tends to be superior. It is preferable that the glass transition point of the polymer that configures the shell polymer is higher than 40° C., 45° C. or higher is more preferable, and 50° C. or higher is still more preferable. By the glass transition point of the polymer that configures the core polymer being −10° C. or higher, it is possible to discharge the polymer particles from the recording head without the core-shell structure further collapsing, and because it is possible for attachment of the polymer particles in the recording nozzles to be further suppressed, the discharge stability tends to be superior. The polymer that configures the shell polymer is preferably a homopolymer or is preferably a copolymer. In a case where the polymer that configures the shell polymer is a homopolymer, it is possible to use one in which the Tg of the homopolymer is disclosed in various documents (for example, a polymer handbook or the like). In a case where the polymer that configures the shell polymer is a co-polymer, it is possible to calculate the Tg of the co-polymer from the $Tg_n$ (unit: K) of the various homopolymers and the mass fraction ($W_n$) of the monomer using the FOX formula below.

It is preferable that the acid value of the polymer that configures the shell polymer is 20 mgKOH/g or more, 30 mgKOH/g is more preferable, and 40 mgKOH/g is still more preferable. By the acid value of the polymer that configures the shell polymer being 20 mgKOH/g or more, since the hydrophilicity with respect to water of the shell polymer improves, the dispersion stability of the polymer particles in the ink composition tends to improve. Since it is possible to more effectively suppress adhering of the polymer particles to the nozzle, the discharge stability from the nozzles of the recording head to be more favorable. Although the upper limit of the acid value of the polymer that configures the shell polymer is not particularly limited, it is preferable that the acid value of the polymer that configures the shell polymer is 400 mgKOH/G or lower. In a case of the polymer that configures the core polymer or the shell polymer includes two or more polymers, the acid value is obtained from the measured values thereof.

The polymer that configures the core polymer or the shell polymer is preferably used singly, or two kinds or more are preferably used together. In a case of two or more types of polymer that configures the core polymer, the glass-transition temperature of the polymer having the lowest glass-transition temperature is the "glass-transition temperature of the polymer that configures the core polymer". In a case of two or more types of polymer that configures the shell polymer, the glass-transition temperature of the polymer having the lowest glass-transition temperature is the "glass-transition temperature of the polymer that configures the shell polymer".

In the core-shell polymer particles in the specification, the polymer that forms the core polymer is preferably delocalized on the core portion and the polymer that forms the shell polymer is preferably delocalized on the shell portion, and the polymer particles preferably do not have a strict boundary between the core portion and the shell portion.

It is particularly preferable that the polymers that configure the core polymer and shell polymer of the polymer particles each are non-crosslinked. By being non-crosslinked, the discharge stability tends to further improve. It is possible for the crosslinking degree of the polymer to be quantified by measuring the gel fraction (below, referred to as the "THF gel fraction") of the polymer using tetrahydrofuran (THF). It is preferable that the THF gel fractions of the polymer that configures the core polymer and the polymer that configures the shell polymer each independently are 10% or less and 5% or less is more preferable. By the THF gel fractions of the polymer that configures the core polymer and the polymer that configures the shell polymer being within the above range, the abrasion resistance of the image recorded on the recording medium tends to further improve.

It is possible for the THF gel fraction to be measured in the following manner. Approximately 10 g of the core-shell polymer particles is placed in a Teflon (registered trademark) Petri dish, and a film was formed by drying for 1 hour at 120° C. The obtained film is immersed for 24 hours at 20° C. and filtered with a 100 mesh filter, further dried for 24 hours at 20° C., and it is possible for the THF gel fraction (%) to be obtained from the following formula.

THF gel fraction (%)=(mass after re-drying/original mass)×100

It is preferable that the mass ratio (c/s) of the mass (c) of the core polymer and the mass (s) of the shell polymer is 0.40 to 4.0, 0.5 to 2.5 is more preferable, and 1.0 to 2.5 is still more preferable. By the mass ratio (c/s) being within the above range, because the balance of the mass of the core polymer and the mass of the shell polymer is favorable, the discharge stability of the ink composition and the abrasion resistance of the image recorded on the recording medium both tend to improve.

It is preferable that ratio ((c/s)/$\phi$) of the average particle diameter $\phi$ (unit: nm) of the polymer particles and the mass ratio (c/s) is 0.010 or more, 0.020 to 1.00 is more preferable, and 0.03 to 0.070 is still more preferable. By the ratio ((c/s)/$\phi$) being within the above range, because the balance of the mass of the core polymer and the mass of the shell polymer is favorable regardless of the size of the polymer particles, the discharge stability of the ink composition and the abrasion resistance of the image recorded on the recording medium both tend to improve.

Method of Synthesizing Polymer Particles

Although the method of synthesizing the polymer particles is not particularly limited, it is possible for the particles to be easily synthesized using known emulsion polymerization method or an appropriate combination thereof. Specifically, examples thereof include a batch mixing polymerization method, a monomer dropping method, a pre-emulsion method, a seed emulsion polymerization method, a multi-stage emulsion polymerization method (such as a two stage emulsion polymerization method), and an inverse emulsion polymerization method. From the viewpoint of the capability making the average particle diameter of the polymer particles minute, an emulsifier free polymerization method is preferable.

A polymerization method in which the core polymer is synthesized first will be described. First, the core particles are synthesized with an ordinary emulsion polymerization method using an aqueous medium. Although the conditions of emulsion polymerization preferably conform to known methods, in the case where the total amount of monomer used is 100 parts, it is ordinarily possible for polymerization to be performed using 100 to 500 parts of water (aqueous medium). It is preferable that the polymerization temperature is −10° C. to 100° C., −5° C. to 100° C. is more preferable, and 0° C. to 90° C. is still more preferable. It is preferable that the polymerization time is 0.1 to 30 hours, and 2 to 25 hours is more preferable. It is possible to use a batch method that incorporates the monomers as a batch, a method that dividedly or continuously supplies the monomer, a method that dividedly or continuously adds the pre-emulsion of the monomer, or a method that stepwise combines these methods as the method of emulsion polymerization. It is possible to use, as necessary, one or two or more types of a polymerization initiator, a molecular weight regulator, an emulsifying agent and the like used in ordinary emulsion polymerization.

Although the polymerization initiator is not particularly limited, it is possible to use a redox system in which persulfates such as potassium persulfate and ammonium persulfate; organic peroxides such as diisopropyl peroxydicarbonate, benzoyl peroxide, lauroyl peroxide, and tert-butyl peroxy-2-ethyl hexanoate; azo compounds such as azobisisobutyronitrile, dimethyl-2,2'-azobisisobutyrate and 2-carbamoyl-aza isobutyronitrile; radical emulsifiers having a peroxide group, sodium bisulfite, and a reducing agent such as ferrous sulfate are combined. The polymerization initiator is preferably used singly, or two kinds or more are preferably used together.

Although not particularly limited, examples of the molecular weight regulator include mercaptans such as n-hexyl mercaptan, n-octyl mercaptan, n-dodecyl mercaptan, t-dodecyl mercaptan, n-hexadecyl mercaptan, n-tetradecyl mercaptan, t-tetradecyl mercaptan, and thioglycolic acid; xanthogen disulfides such as dimethyl xanthogen disulfide, diethyl xanthogen disulfide, and diisopropyl xanthogen disulfide; thiuram disulfides such as tetramethyl thiuram disulfide, tetraethyl thiuram disulfide, and tetra-butyl disulfide; halogenated hydrocarbons such as chloroform, carbon tetrachloride, carbon tetrabromide, and ethylene bromide; hydrocarbons such as pentaphenyl ethane, and α-methyl styrene dimer; acrolein, methacrolein, allyl alcohol, 2-ethylhexyl thioglycolate, terpinolene, α-terunepin, γ-terunepin, dipentene, and 1,1-diphenyl ethylene. The molecular weight regulator is preferably used singly, or two kinds or more are preferably used together.

Although not particularly limited, examples of the emulsifier include anionic surfactants such as alkylsulfuric acid ester salt, and alkylbenzene sulfonic acid salts; nonionic surfactants such as alkyl esters of polyethylene glycol, alkyl ethers of polyethylene glycols, alkyl phenyl ethers of polyethylene glycol; reactive emulsifiers having a hydrophilic group, a hydrophobic group, and a radical reactive group; vinyl-based polymers, and polymeric emulsifiers to which a hydrophilic group is introduced to polymer such as polyester-based polymers. The emulsifiers are preferably used singly, or two or more types are preferably used together. The wording "hydrophilic group" is an atomic group with a high affinity with respect to water, and examples include a nitro group, a hydroxyl group, an amino group, a carboxyl group, and a sulfonate group. The wording "hydrophobic group" is an atomic group with a lower affinity with respect to water than the hydrophilic group, and examples include a linear or branched alkyl group, an alicyclic group, an aromatic ring group, an alkylsilyl group, and a perfluoroalkyl group.

Next, the monomer for the shell polymer is polymerized in the presence of the obtained core polymer. Specifically, it is possible to form the core-shell polymer particles by seed polymerizing the monomer for the shell polymer in a state in which the obtained core particles are used as the seed particles. The monomer for the shell polymer or the pre-emulsion thereof is preferably added dropwise in a batch, divided, or continuously to the aqueous medium in which the core particles are dispersed. It is preferable that the amount of the core particles used at the time is 25 parts by mass to 250 parts by mass with respect to 100 parts by mass of the monomer for the shell polymer. In a case of using the polymerization initiator, the molecular weight regulator, the emulsifier, and the like when polymerizing, it is possible for the same one as during the manufacturing of the core particles to be used. The conditions such as the polymerization time are preferably the same as the manufacturing time of the core particles.

A polymerization method in which the shell polymer is synthesized first will be described. First, the shell polymer is synthesized. Specifically, a pre-emulsion solution including the above-described hydrophilic monomer is prepared using the reactive emulsifier, the pre-emulsion solution is added dropwise to the aqueous solution with the polymerization initiator, and the shell polymer is synthesized with the polymerization reaction.

Next, the obtained shell polymer is polymerized, the core polymer is polymerized, thereby synthesizing the polymer particles according to the embodiment. Specifically the monomer mixture that includes the above-described hydrophobic monomer is added dropwise to the aqueous dispersion medium containing the shell polymer, and the core polymer is polymerized, thereby forming the polymer particles. In a case of polymerizing the shell polymer, it is not necessary that the emulsifying be contained in the monomer mixture, and it is possible for the emulsifier to be added dropwise as monomer oil droplets.

According to the multi-stage emulsion polymerization method, because the shell polymer is synthesized using the reaction emulsifier, and emulsion free synthesis of the core polymer is possible, it is possible for the content of the emulsifier in the ink composition to be easily made 0.01 mass % or less. When the content of the contained emulsifier is 0.01 mass % or less in the ink composition, aggregation of the ink components at the ink interface (gas-liquid interface at the atmosphere-ink, solid-liquid interface at ink contact member-ink such as an ink accommodation container) is suppressed and the storage stability is excellent, and thus, is preferable. When the content of the contained emulsifier is 0.01 mass % or less in the ink composition, because the foamability and defoaming are excellent, it is possible to preferably use and ink accommodation container having a fill port able to be filled with ink. The wording "ink accommodation container having a fill port able to be filled with ink" indicates an ink accommodation container having a fill port that is detachable or openable and closable, and while a user is able to easily pour in the ink composition, foaming easily arises during pouring. The ink composition is easily filled when the opening area of the fill port is 20 mm$^2$ or more, and thus, is preferable. Such an ink accommodation container is disclosed in JP-A-2005-219483 or JP-A-2012-51309.

Even in a case of synthesizing the polymer particles using a large amount of emulsifier, the content of the emulsifier contained in the ink composition is preferably made 0.01 mass % or less by removing excess emulsifier after synthesizing the polymer particles.

Finally, by adjusting the pH by neutralizing with bases such as sodium hydroxide, potassium hydroxide, and ammonia, and filtering, as necessary, the core-shell polymer particle dispersion liquid is obtained.

Although not particularly limited, it is preferable that the formation sequence of the core polymer and the shell polymer use a polymerization method in which the shell polymer is first polymerized, and the core polymer is polymerized thereafter.

Water

The ink composition according to the embodiment includes water. It is possible for pure waters, such as ion-exchange water, ultrafiltered water, reverse osmosis water, and distilled water or ultrapure water to be used as the water, without being particularly limited. By including the water, it is possible to reduce the organic solvent, and, as a result, it is possible to make an environmentally conscious ink composition.

It is preferable that content of the water is 50 mass % to 85 mass % with respect to the total amount of the ink composition. By the content of the water being within this range, the discharge stability and adhesiveness tend to further improve.

Surfactant

It is preferable that the ink composition according to the embodiment includes a surfactant. Although not particularly limited, examples of the surfactant include acetylene glycol-based surfactants, fluorine based surfactants, and silicone based surfactants. By the ink composition including these surfactants, the wettability of the ink composition attached to the recording medium tends to further improve.

Although not particularly limited, it is preferable that the acetylene glycol-based surfactant is at least one type selected from alkylene oxide adducts of 2,4,7,9-tetramethyl-5-decyne-4,7-diol, and 2,4,7,9-tetramethyl-5-decyne-4,7-diol, and alkylene oxide adducts of 2,4-dimethyl-5-decyne-4-ol and 2,4-dimethyl-5-decyne-4-ol. Although not particularly limited, examples of commercially available fluorine based surfactants include the Olfine (registered trademark) 104 series, or E series, such as Olfine E1010 (manufactured by Air Products), and Surfynol (registered trademark) 465, and Surfynol 61 (manufactured by Nissin Chemical Industry Co., Ltd.). The acetylene glycol-based surfactant is preferably used individually, or two or more types are preferably used together.

Although not particularly limited, examples of the fluorine-based surfactant include perfluoroalkylsulfonates, perfluoroalkylcarboxylates, perfluoroalkylphosphoric acid esters, perfluoroalkylethylene oxide adducts, perfluoroalkylbetaines, and perfluoroalkylamine oxide compounds. Although not particularly limited, examples of commercially available fluorine-based surfactants include S-144 and S-145 (manufactured by Asahi Glass), FC-170C, FC-430, and Fluorad FC4430 (manufactured by Sumitomo 3M Limited), FSO, FSO-100, FSN, FSN-100, and FS-300 (manufactured by Dupont), and FT-250 and 251 (manufactured by Neos Company Limited). These fluorine-based surfactants are preferably used independently or two or more types are preferably used in combination.

Examples of the silicone-based surfactant include polysiloxane-based compounds and polyether-modified organosiloxanes. Although not particularly limited, examples of commercially available silicone-based surfactants include BYK-306, BYK-307, BYK-333, BYK-341, BYK-345, BYK-346, BYK-347, BYK-348 and BYK-349 (all product names, manufactured by BYK-Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all product names, manufactured by Shin-Etsu Chemical Co., Ltd.).

It is preferable that the content amount of the surfactant in the ink composition is 0.1 mass % to 5.0 mass % with respect to the total amount of the ink composition, and 0.1 to 3.0 mass % is more preferable. By the content of the surfactant being within this range, the wettability of the ink composition attached to the recording medium tends to further improve.

Penetrant

It is preferable that the ink composition according to the embodiment further includes a penetrant. By the ink composition quickly impregnating (or wetting and spreading on) the recording medium, it is possible to obtain a recording material with little image bleeding and unevenness.

Although not particularly limited, preferable examples of the penetrant include alkyl ethers (glycol ether) and alkyl diols of polyvalent alcohols. Although not particularly limited, examples of the glycol ether include, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether.

Although not particularly limited, examples of the alkyldiol include 1,2-pentanediol and 1,2-hexanediol, 1,2-propanediol, 1,3-propanediol, 1,4-butanediol, 1,5-pentanediol, 1,6-hexanediol, 1,7-heptanediol, and 1,8-octanediol.

These penetrants are preferably used singly, or two or more are preferably used in combination.

It is preferable that the content of the penetrant in the ink composition is 0.1 mass % to 20 mass % with respect to the total amount of the ink composition, and 0.5 to 10 mass % is more preferable. By the content being 0.1 mass % or more, it is possible for the penetrance of the ink composition to the recording medium to be increased. Meanwhile, by the content being 20 mass % or less, it is possible to prevent bleeding from occurring in the image, and the viscosity of the ink composition tends to be better suppressed.

Cyclic Amide Compound

It is preferable that the ink composition according to the embodiment further includes a cyclic amide compound. By the ink composition including the cyclic amide compound, because the stability of the polymer particles is further improved and it is possible to effectively prevent precipitation of foreign substances in the ink composition, the storage stability, particularly at high temperatures, tends to be superior. Because the cyclic amide compound has a moisturizing capability, it is possible to prevent the polymer particles and other components from aggregating and solidifying due to the water content evaporating during storage of the ink composition. In so doing, clogging in the vicinity of the nozzles of the head during ink jet recording is prevented, and the discharge stability of the ink composition tends to be superior. There is an effect of promoting the softening of the polymer particles, and the adhesiveness tends to improve even in a case of a low heating temperature.

Although not particularly limited, examples of the cyclic amide compound include 2-pyrrolidone, N-methyl-2-pyrrolidone, and N-ethyl-2-pyrrolidone. Among these, 2-pyrrolidone is preferable. The cyclic amide compound is preferably used singly, or two or more types are preferably used together.

It is preferable that the content of the cyclic amide compound in the ink composition is 0.5 mass % to 10 mass % with respect to the total amount of the ink composition. By the content being within the above ranges, any of the long term storage stability, discharge stability of the ink composition and the abrasion resistance of the recorded material stemming from excellent adhesiveness of the ink composition tends to be superior.

Resin Emulsion

The ink composition according to the embodiment preferably further contains a resin emulsion. By using the resin emulsion, because the pigment is fastened to the recording medium by the resin within the resin emulsion, and the resin and the pigment fusing to one another along with the drying of the ink, it is possible for the abrasion resistance and the adhesiveness of the image parts of the recording material to be much improved. Among these resin emulsions, urethane resin emulsions and acrylic resin emulsions are preferable.

The urethane resin is not particularly limited as long as the resin emulsion has a urethane bond in the molecule, and examples thereof include a polyether urethane resin including an ether bond in the main chain thereof, a polyester-type urethane resin including an ester bond in the main chain thereof, and a polycarbonate urethane resin including a polycarbonate bond in the main chain thereof.

Although not particularly limited, examples of the acrylic resin emulsion include those in which (meth)acrylic monomers, such as (meth)acrylic acid and (meth)acrylic acid ester, are polymerized, and those in which a (meth)acrylic monomer and another monomer are co-polymerized.

Among these, at least one type selected from a group consisting of a (meth)acrylic resin and a styrene-(meth) acrylate copolymer-based resin is preferable, at least one type selected from a group consisting of an acrylic resin and a styrene-acrylate copolymer-based resin is more preferable, and a styrene-acrylate copolymer-based resin is still more preferable. The above copolymers preferably have the form of any of random copolymers, block copolymers, alternating copolymers, and graft copolymers.

These resins are preferably used singly, or two or more types are preferably used in combination.

It is preferable that the resin content of the resin emulsion is 3 mass % to 10 mass % with respect to the total amount of the ink composition, and 3 mass % to 5 mass % is more preferable. By being within the above ranges, the adhesiveness and the abrasion resistance of the recording material tend to further improve, and the long-term storage stability of the ink tends to be superior and the viscosity of the ink in particular tends to be able to be lowered.

Other Components

In order to favorably maintain the storage stability of the ink composition and the discharge stability from the head, in order to improve clogging, or in order to prevent deterioration in the ink composition, it is possible to add, as appropriate, various additives such as solvents, moisturizing agents, dissolution aids, viscosity adjusters, pH adjusters, antioxidants, preservatives, antifungal agents, anti-corrosive agents and chelating agents for trapping metal ions that influence the dispersion.

Surface Tension

It is preferable that the surface tension of the ink composition at 25° C. is 20 mPa·s to 50 mPa·s, and 20 mPa·s to 40 mPa·s is more preferable. By the surface tension being within this range, the discharge stability tends to be favorable. It is possible for the surface tension to be measured using a surface tension meter based on the Wilhelmy method.

Viscosity

It is preferable that the viscosity of the ink composition at 25° C. is 20 mPa·s or lower, and 10 mPa·s or lower is more preferable. By the viscosity being within this range, the discharge stability tends to be favorable. It is possible to measure the viscosity to be measured using a viscometer.

Recording Medium

The recording medium is a low absorbency recording medium, or a non-absorbent recording medium. A recording medium is used that is pre-heated before the ink composition is attached or heated during attachment. By performing recording on a heated non-absorbent recording medium or a low absorbency recording medium using the ink composition of the embodiment, it is possible to soften the shell polymer when the ink composition is attached to the recording medium and to form a film with excellent abrasion resistance. Because the recording medium is preferably heated, the nozzles are preferably not heated, as necessary, in order for the viscosity of the ink composition to be lowered. In so doing, it is possible to prevent fusing of the components, such as the polymer, in the ink composition on the inner wall of the nozzle, and the clogging recovery becomes excellent. It is preferable that the surface temperature of the recording medium during heating is 30° C. to 60° C., and 40° C. to 60° C. is more preferable.

Although not particularly limited, examples of the low absorbency recording medium include coated papers provided with a coating layer for receiving an oil based ink composition on the surface thereof. Although not particularly limited, examples of the coated paper include book printing papers, such as art paper, coated papers, and matte papers.

Although not particularly limited, examples of the non-absorbent recording medium include films or plates of plastics such as polyvinyl chloride, polyethylene, polypropylene, and polyethylene terephthalate (PET), plates of metals such as iron, silver, copper and aluminum, or metal plates or plastic films manufactured by deposition of these various metals, or alloy plates such as stainless steel or brass.

The terms "low absorbency recording medium" and "non-absorbent recording medium" refer to a recording medium with a water absorption amount from the start of contact up to 30 msec being 10 mL/m$^2$ or less in the Bristow method. The Bristow method is the most widespread method used as a method of measuring a liquid absorption amount in a short time, and is also employed by the Japan Technical Association of the Pulp and Paper Industry (JAPAN TAPPI). The details of the testing method are disclosed in the standard No. 51 "Paper and Cardboard—Liquid Absorbency Test Method—Bristow Method" of the "JAPAN TAPPI Paper Pulp Test Method 2000 Edition".

In addition, non-absorbent or low absorbency recording media may be classified according to wettability with respect to water on the recording surface. For example, it is possible to characterize recording media by adding a 0.5 µL water droplet onto the recording surface of the recording medium and measuring the rate of decrease in the contact angle (comparison of the contact angle 0.5 ms and the contact angle at 5 sec. after landing). More specifically, the wording non-absorbent in "non-absorbent recording medium" indicates that the above-described lowering rate is less than 1%, and low absorbency in "low absorbency recording medium" indicates that the lowering rate is 1% or higher to less than 5%. "Absorbent" indicates a lowering rate of 5% or more. It is possible for the contact angle to be measured using a portable contact angle meter PCA-1 (manufactured by Kyowa Kaimen Kagaku), or the like.

Ink Set

The ink set of the embodiment includes a light ink composition that is the ink composition in which the content of pigment included in the ink composition is less than 0.8 mass % with respect to the total amount of the ink composition, and a dark ink composition that is the ink composition according to any one of claims 1 to 12, in which the content of the pigment included in the ink composition is 0.8 mass % or more with respect to the total amount of the ink composition.

It is possible for the ink composition to be used as a light ink composition or as a dark ink composition. Therefore, even with an ink set provided with a light ink composition and a dark ink composition, the clogging recovery becomes excellent. The ink set of the embodiment is preferably provided with another ink composition, and is preferably provided with one type or two or more types of light ink composition and dark ink composition.

Ink Jet Recording Method

The recording method of the embodiment includes a heating step of heating the non-absorbent recording medium or low-absorbency recording medium, and a discharging step of discharging the ink composition, or the light ink composition or dark ink composition that configure the ink set and attaching the ink composition on the non-absorbent recording medium or low absorbency recording medium.

FIG. 1 is a schematic cross-sectional view showing an example of a recording apparatus used in the embodiment. As shown in FIG. 1, the recording apparatus 1 is provided with a recording head 2, an IR heater 3, a platen heater 4, a curing heater 5, a cooling fan 6, a pre-heater 7 and an airflow fan 8.

Heating Step

The heating step is a step of heating the non-absorbent recording medium or the low absorbency recording medium. It is possible for the heating step to be performed by the IR heater 3, the platen heater 4 or the pre-heater 7. By heating the non-absorbent recording medium or low absorbency recording medium, the shell polymer of the polymer particles attached to the recording medium is easily softened, and it is possible for a recording material with excellent abrasion resistance to be obtained. It is preferable that the surface temperature of the recording medium is 40° C. to 120° C., 55° C. to 100° C. is more preferable, and 60° C. to 95° C. is still more preferable. It is preferable that the surface temperature of the recording medium in this case is lower than the glass-transition temperature of the polymer included in the shell polymer. Thereby, it is possible to prevent the core-shell structure of the polymer particles in the printing head from collapsing due to the radiation heating of the recording medium.

Discharging Step

The discharging step is a step in which the ink composition, or the light ink composition or dark ink composition that configures the ink set is discharged from the nozzles, and attached on the non-absorbent recording medium or low absorbency recording medium. It is possible to use methods known in the related art as the discharge unit (recording head 2) for the ink composition, and examples thereof include discharging liquid droplets using the vibration of a piezoelectric element, that is, forming ink droplets through mechanical deformation of an electrostrictive element.

By including the heating step and the discharging step, it is possible to suppress the polymer particles from attaching in the recording head 2 without softening of the shell polymer of the polymer particles in the ink composition in the recording head 2, and the discharge stability is thereby improved.

Drying Process

The recording method of the embodiment preferably includes a drying step in which the ink composition is dried. Although not particularly limited, examples of the drying unit include units such as the curing heater 5, a warm-air mechanism (not shown), and a thermostatic bath (not shown). By the drying unit heating the recording medium on which an image is recorded, the water content included in the ink composition is more quickly evaporated and dispersed and a coating film is formed by the polymer particles included in the ink composition. In this way, the film derived from the ink composition is strongly fixed (attached) on the recording medium, and it is possible for a high quality image with excellent abrasion resistance to be obtained in a short time. It is preferable that the surface temperature of the recording medium in this case is higher than the glass-transition temperature of the polymer included in the shell polymer. Thereby, softening of the shell polymer is promoted, the core polymer flows out from the interior, and it is possible for the adhesiveness and the abrasion resistance to be improved.

The wording "heating the recording medium", refers to the temperature of the recording medium being raised to a predetermined temperature, and is not limited to directly heating the recording medium.

The recording apparatus 1 preferably includes a cooling fan 6. After drying, by cooling the ink composition on the recording medium with the cooling fan 6, a film with better adhesiveness on the recording medium tends to be able to be formed.

The recording apparatus 1 is preferably further provided with an air-flow fan 8 so as to more effectively dry the ink composition attached to the recording medium.

EXAMPLES

Below, the examples and the comparative examples of the invention will be more specifically described. The invention is not limited by any of the following examples.

Material for Ink Composition

The main materials for the ink composition used in the examples and the comparative examples are as follows.

Pigments
Cyan Pigment (C.I. Pigment Blue 15:3)
Magenta Pigment (γ type Pigment Violet 19)
White Pigment (NanoTek® Slurry manufactured by C.I. KASEI CO., LTD.)
Penetrant
1,2 hexane diol
1,2-propane diol
Cyclic Amide Compound
2-pyrrolidone
Surfactant
Olfine E1010 (acetylene glycol-based surfactant, manufactured by Aero Products)
BYK-348 (silicone-based surfactant, manufactured by BYK Japan KK) (resin emulsion)
Joncryl 7100 (manufactured by BASF Corporation, styrene/acrylic aqueous resin emulsion, solid content 48%, Tg−10° C., acid value 51)
Joncryl 7610 (manufactured by BASF Corporation, acrylic resin emulsion, solid content 52%, Tg 96° C., acid value 50)

Polymer particles 1 to 4 manufactured as follows were used as the polymer particles. The types and content of the monomer unit in the polymer particles 1 to 4 and the various characteristics of the polymer particles 1 to 4 are as shown in Table 1.

Production Example 1: Polymer Particles 1

A dropping device, a thermometer, a water-cooled reflux condenser, and a stirrer are provided in the reaction container, after 100 parts of ion-exchange water were introduced, and 2 parts of a 10% solution of ammonium persulfate were added while stirring in a nitrogen atmosphere at 70° C. and a reaction liquid formed from 30 parts of ion-exchange water, 56 parts of methyl methacrylate, 7 parts of lauryl methacrylate, 7 parts of acrylic acid, and 0.5 parts of t-dodecylmercaptan was added while being stirred at 70° C. and subjected to polymerization reaction, the resultant was neutralized to a pH of 8 to 8.5 with sodium hydroxide, thereby preparing the shell polymer, and thereafter the core polymer was prepared by dropwise addition of a monomer solution in which 12 parts of styrene, parts of butyl acrylate and 0.02 parts of t-dodecyl mercaptan were added to 0.2 parts of a polymerization initiator of potassium persulfate and 7 parts of ion exchange water and reacted at 70° C. Thereafter, polymer particles 1 were formed by preparing a polymer fine particle-water dispersion filtered with a 1.0 μm filter.

Production Examples 2 to 5

Using the monomer components disclosed in Table 1, the polymer particles 2 to 5 were manufactured by including the same procedure as Production Example 1.

In each of the polymer particles, the glass-transition temperature Tg of the shell polymer and the core polymer is calculated using the FOX formula.

TABLE 1

| | Polymer Particles Used | | | | |
|---|---|---|---|---|---|
| | Polymer Particles 1 | Polymer Particles 2 | Polymer Particles 3 | Polymer Particles 4 | Polymer Particles 5 |
| Tg (° C.) of resin configuring core polymer | −10 | 0 | 20 | 40 | 80 |

TABLE 1-continued

|  |  | Polymer Particles Used | | | | |
|---|---|---|---|---|---|---|
|  |  | Polymer Particles 1 | Polymer Particles 2 | Polymer Particles 3 | Polymer Particles 4 | Polymer Particles 5 |
| Tg (° C.) of resin configuring shell polymer | | 76 | 41 | 76 | 76 | 72 |
| Shell Component | MMA | 56 | 45.5 | 56 | 56 | 53.5 |
|  | BMA | 0 | 0 | 0 | 0 | 0 |
|  | LMA | 7 | 17.5 | 7 | 7 | 5.5 |
|  | AA | 7 | 7 | 7 | 7 | 7 |
| Core Component | BA | 18 | 15 | 12 | 9 | 2.4 |
|  | St | 12 | 15 | 18 | 21 | 27.6 |
| (c/s) | | 2.3 | 2.3 | 2.3 | 2.3 | 2.3 |
| Average Particle Diameter φ (nm) | | 30 | 40 | 60 | 40 | 40 |
| (c/s)/φ | | 0.0767 | 0.0575 | 0.0383 | 0.0575 | 0.0575 |
| Acid Value | | 60 | 60 | 60 | 60 | 60 |
| Monomer Total Amount | | 100 | 100 | 100 | 100 | 100 |

MMA: methacrylic acid methyl
BMA: methacrylic acid butyl
LMA: methacrylic acid lauryl
AA: acrylic acid
BA: butyl acrylate
St: styrene (Preparation of Ink Composition)

Each of the materials was mixed so as to have the constitutions shown in the following Tables 3 to 5 and sufficiently stirred, thereby obtaining each of the cyan (C), magenta (M), light magenta (Lm), light cyan (Lc) and white (W) ink compositions. In the above Table 1 and the following Tables 3 to 5, the unit of the numerical values is mass %, and the total is 100.0 mass %. The pigment, polymer particles, and resin emulsion are denoted as solid conversion content. The average particle diameter of the pigment is shown in Table 2.

TABLE 2

|  | Pigment | | |
|---|---|---|---|
|  | Cyan Pigment | Magenta Pigment | White Pigment |
| Average Particle Diameter φ (nm) | 70 | 80 | 300 |

Examples 1 to 5, Comparative Examples 1 to 3

Abrasion Resistance: Single Color

An ink jet printer (product name: PX-W8000, manufactured by Seiko Epson Corp.) was filled with the ink composition and a recording medium (clear proof film, manufactured by Seiko Epson corp.) was recorded. Specifically, a fill pattern capable of being recorded at a resolution of 720 dpi horizontally and 720 dpi vertically and at a duty of 100% was created, and this pattern was used. In this case, the surface temperature of the recording medium was made 50° C. The evaluation was performed in a laboratory in room temperature (25° C.) conditions.

Thereafter, the recorded surface of the recording material left for one hour in laboratory in room temperature (25° C.) conditions was measured for abrasion resistance using an AB-301 Color Fastness Rubbing Tester (manufactured by Tester Sangyo Co., Ltd.) by verifying the peeling state of the recorded surface and the ink transfer state to a cotton cloth of when rubbed with a cotton cloth 20 times with a load of 200 g. The evaluation criteria of the abrasion resistance are as follows.

A: no ink peeling nor ink transfer to the cotton cloth found even after rubbing 20 times.
B: ink peeling or ink transfer to the cotton cloth found after rubbing 11 to 15 times.
C: ink peeling or ink transfer to the cotton cloth found after rubbing 6 to 10 times.
D: ink peeling or ink transfer to the cotton cloth found after rubbing 1 to 5 times.

Abrasion Resistance: Multiple Colors

An ink jet printer (product name: PX-W8000, manufactured by Seiko Epson Corp.) was filled with each color of the ink composition using the ink set shown Tables and 4, and a recording medium (clear proof film, manufactured by Seiko Epson corp.) was recorded. Specifically, a fill pattern capable of being recorded at a resolution of 720 dpi horizontally and 720 dpi vertically and at a duty of 20% was created, and this pattern was used. In this case, the surface temperature of the recording medium was made 50° C. The abrasion resistance was tested with respect to a recording sample on which recording was performed by superimposing each of the colors at the same time. The evaluation was performed in a laboratory in room temperature (25° C.) conditions.

Thereafter, the recorded surface of the recording material left for one hour in laboratory in room temperature (25° C.) conditions was measured for abrasion resistance using an AB-301 Color Fastness Rubbing Tester (manufactured by Tester Sangyo Co., Ltd.) by verifying the peeling state of the recorded surface and the ink transfer state to a cotton cloth of when rubbed with a cotton cloth 20 times with a load of 200 g. The evaluation criteria of the abrasion resistance are as follows.

A: no ink peeling nor ink transfer to the cotton cloth found even after rubbing 20 times.
B: ink peeling or ink transfer to the cotton cloth found after rubbing 11 to 15 times.
C: ink peeling or ink transfer to the cotton cloth found after rubbing 6 to 10 times.
D: ink peeling or ink transfer to the cotton cloth found after rubbing 1 to 5 times.

Discharge Stability

An ink jet printer (product name: PX-W8000, manufactured by Seiko Epson Corp.) was filled with the ink composition, solid recording with a 100% duty was performed with respect to the 1000 A4 recording media (clear proof film, manufactured by Seiko Epson corp.), bending and omission of the nozzles after recording were investigated. In this case, the surface temperature of the recording medium was made 50° C.
A: 0 occurrences of nozzle omission, bending
B: 1 to 3 occurrences of nozzle omission, bending
C: 4 to 10 occurrences of nozzle omission, bending
D 11 to 20 occurrences of nozzle omission, bending
Clogging Recovery An ink jet printer (product name: PX-W8000, manufactured by Seiko Epson Corp.) was filled with the ink composition and it was confirmed that ordinary recording was possible using the printer driver without nozzles clogging. Thereafter, the printer was left at room temperature for one week with the cap removed. Next, head cleaning was performed, and the number of cleanings until the nozzle omissions and bending of the head achieve the same extent as before being left, that is, the number until the nozzles of the head are restored, was investigated. In this case, the surface temperature of the recording medium was made 50° C.
A: All nozzles restored within 0 to 3 cleanings.
B: All nozzles restored within 4 to 10 cleanings.
C: All nozzles restored within 11 to 20 cleanings
D: Not restored even at 20 cleanings.

Embodiments 6 to 8

Quick Drying Properties

An ink jet printer (product name: PX-W8000, manufactured by Seiko Epson Corp.) was filled with each color of ink composition using the ink set shown in Table 5, and a recording medium (clear proof film, manufactured by Seiko Epson corp.) was recorded. Specifically, a fill pattern capable of being recorded at a resolution of 720 dpi horizontally and 720 dpi vertically and at a duty of 20% was created, and this pattern was used. In this case, the surface temperature of the recording medium was made 50° C. The quick drying properties were tested with respect to a recording sample on which recording was performed by superimposing each of the colors at the same time. The evaluation was performed in a laboratory in room temperature (25° C.) conditions.

Thereafter, the recorded surface of the recording material left for 10 minutes in laboratory in room temperature (25° C.) conditions was measured for quick drying properties using an AB-301 Color Fastness Rubbing Tester (manufactured by Tester Sangyo Co., Ltd.) by verifying the peeling state of the recorded surface and the ink transfer state to a cotton cloth of when rubbed with a cotton cloth 20 times with a load of 200 g. The evaluation criteria of the quick drying properties were as follows.
A: No difference between the test results of the abrasion resistance and the evaluation.
B: Evaluation one step lower than the testing results of the abrasion resistance.
C: Evaluation two or more steps lower than the testing results of the abrasion resistance.
Discharge Stability An ink jet printer (product name: PX-W8000, manufactured by Seiko Epson Corp.) was filled with the ink composition, solid recording with a 100% duty was performed with respect to the 1000 A4 recording media (clear proof film, manufactured by Seiko Epson corp.), bending and omission of the nozzles after recording were investigated. In this case, the surface temperature of the recording medium was the temperature noted in Table 5.
A: 0 occurrences of nozzle omission, bending
B: 1 to 3 occurrences of nozzle omission, bending
C: 4 to 10 occurrences of nozzle omission, bending
D 11 to 20 occurrences of nozzle omission, bending

TABLE 3

| | | Example 1 | | | | | Example 2 | | | | |
|---|---|---|---|---|---|---|---|---|---|---|---|
| | Ink Set | C | M | Lm | Lc | W | C | M | Lm | Lc | W |
| Pigment | Cyan Pigment | 3 | | | 0.5 | | 3 | | | 0.5 | |
| | Magenta Pigment | | 3 | 0.5 | | | | 3 | 0.5 | | |
| | White Pigment | | | | | 10 | | | | | 10 |
| Moisturizer | 1,2-hexanediol | 3 | 3 | 3 | 3 | 3 | 3 | 3 | 3 | 3 | 3 |
| | propylene glycol | 5 | 5 | 5 | 5 | 5 | 5 | 5 | 5 | 5 | 5 |
| Cyclic Amide Compound | 2-pyrrolidone | 5 | 5 | 5 | 5 | 5 | 5 | 5 | 5 | 5 | 5 |
| Surfactant | Olfine E1010 | 0.5 | 0.5 | 0.5 | 0.5 | 0.5 | 0.5 | 0.5 | 0.5 | 0.5 | 0.5 |
| | BYK348 | 0.3 | 0.3 | 0.3 | 0.3 | 0.3 | 0.3 | 0.3 | 0.3 | 0.3 | 0.3 |
| Polymer Particles | Polymer Particles 1 | 3 | 3 | 5 | 5 | 3 | | | | | |
| | Polymer Particles 2 | | | | | | 3 | 3 | 5 | 5 | 3 |
| | Polymer Particles 3 | | | | | | | | | | |
| | Polymer Particles 4 | | | | | | | | | | |
| | Polymer Particles 5 | | | | | | | | | | |
| Resin Emulsion | Joncryl 7100 | | | | | | | | | | |
| | Joncryl 7610 | | | | | | | | | | |
| | Ion Exchange Water | Remainder | Remainder | Remainder | Remainder | Remainder | Remainder | Remainder | Remainder | Remainder | Remainder |
| | Surface Temperature (° C.) of Recording Medium | | | 70 | | | | | 55 | | |
| | Abrasion Resistance: single color | A | A | A | A | A | B | B | B | B | B |
| | Abrasion Resistance: plural colors | | | A | | | | | B | | |
| | Discharge Stability | B | B | B | B | B | B | B | B | B | B |
| | Clogging Recovery | A | A | A | A | A | B | B | B | B | B |

TABLE 3-continued

|  |  | Example 3 | | | | | Example 4 | | | | |
| --- | --- | --- | --- | --- | --- | --- | --- | --- | --- | --- | --- |
| Ink Set | | C | M | Lm | Lc | W | C | M | Lm | Lc | W |
| Pigment | Cyan Pigment | 3 |  |  | 0.5 |  | 3 |  |  | 0.5 |  |
|  | Magenta Pigment |  | 3 | 0.5 |  |  |  | 3 | 0.5 |  |  |
|  | White Pigment |  |  |  |  | 10 |  |  |  |  | 10 |
| Moisturizer | 1,2-hexanediol | 3 | 3 | 3 | 3 | 3 | 3 | 3 | 3 | 3 | 3 |
|  | propylene glycol | 5 | 5 | 5 | 5 | 5 | 5 | 5 | 5 | 5 | 5 |
| Cyclic Amide Compound | 2-pyrrolidone | 5 | 5 | 5 | 5 | 5 | 5 | 5 | 5 | 5 | 5 |
| Surfactant | Olfine E1010 | 0.5 | 0.5 | 0.5 | 0.5 | 0.5 | 0.5 | 0.5 | 0.5 | 0.5 | 0.5 |
|  | BYK348 | 0.3 | 0.3 | 0.3 | 0.3 | 0.3 | 0.3 | 0.3 | 0.3 | 0.3 | 0.3 |
| Polymer Particles | Polymer Particles 1 |  |  |  |  |  |  |  |  |  |  |
|  | Polymer Particles 2 |  |  |  |  |  |  |  |  |  |  |
|  | Polymer Particles 3 | 3 | 3 | 5 | 5 | 3 | 3 | 3 | 3 | 3 | 3 |
|  | Polymer Particles 4 |  |  |  |  |  |  |  |  |  |  |
|  | Polymer Particles 5 |  |  |  |  |  |  |  |  |  |  |
| Resin Emulsion | Joncryl 7100 |  |  |  |  |  |  |  |  |  |  |
|  | Joncryl 7610 |  |  |  |  |  |  |  |  |  |  |
|  | Ion Exchange Water | Remainder | Remainder | Remainder | Remainder | Remainder | Remainder | Remainder | Remainder | Remainder | Remainder |
| Surface Temperature (° C.) of Recording Medium | | | | 50 | | | | | 40 | | |
| Abrasion Resistance: single color | | B | B | B | B | B | B | B | B | B | B |
| Abrasion Resistance: plural colors | | | B | | | | | B | | | |
| Discharge Stability | | B | B | B | B | B | B | B | B | B | B |
| Clogging Recovery | | B | B | B | B | B | B | B | B | B | B |

|  |  | Example 5 | | | | |
| --- | --- | --- | --- | --- | --- | --- |
| Ink Set | | C | M | Lm | Lc | W |
| Pigment | Cyan Pigment | 3 |  |  | 0.5 |  |
|  | Magenta Pigment |  | 3 | 0.5 |  |  |
|  | White Pigment |  |  |  |  | 10 |
| Moisturizer | 1,2-hexanediol | 3 | 3 | 3 | 3 | 3 |
|  | propylene glycol | 5 | 5 | 5 | 5 | 5 |
| Cyclic Amide Compound | 2-pyrrolidone | 5 | 5 | 5 | 5 | 5 |
| Surfactant | Olfine E1010 | 0.5 | 0.5 | 0.5 | 0.5 | 0.5 |
|  | BYK348 | 0.3 | 0.3 | 0.3 | 0.3 | 0.3 |
| Polymer Particles | Polymer Particles 1 |  |  |  |  |  |
|  | Polymer Particles 2 |  |  |  |  |  |
|  | Polymer Particles 3 |  |  |  |  |  |
|  | Polymer Particles 4 | 3 | 3 | 3 | 3 | 3 |
|  | Polymer Particles 5 |  |  |  |  |  |
| Resin Emulsion | Joncryl 7100 |  |  |  |  |  |
|  | Joncryl 7610 |  |  |  |  |  |
|  | Ion Exchange Water | Remainder | Remainder | Remainder | Remainder | Remainder |
| Surface Temperature (° C.) of Recording Medium | | | | 40 | | |
| Abrasion Resistance: single color | | B | B | B | B | B |
| Abrasion Resistance: plural colors | | | | B | | |
| Discharge Stability | | A | A | A | A | A |
| Clogging Recovery | | B | B | B | B | B |

TABLE 4

|  |  | Comparative Example 1 | | | | | Comparative Example 2 | | | | |
| --- | --- | --- | --- | --- | --- | --- | --- | --- | --- | --- | --- |
| Ink Set | | C | M | Lm | Lc | W | C | M | Lm | Lc | W |
| Pigment | Cyan Pigment | 3 |  |  | 0.5 |  | 3 |  |  | 0.5 |  |
|  | Magenta Pigment |  | 3 | 0.5 |  |  |  | 3 | 0.5 |  |  |
|  | White Pigment |  |  |  |  | 10 |  |  |  |  | 10 |
| Moisturizer | 1,2-hexanediol | 3 | 3 | 3 | 3 | 3 | 3 | 3 | 3 | 3 | 3 |
|  | Propylene glycol | 5 | 5 | 5 | 5 | 5 | 5 | 5 | 5 | 5 | 5 |
| Cyclic Amide Compound | 2-pyrrolidone | 5 | 5 | 5 | 5 | 5 | 5 | 5 | 5 | 5 | 5 |

TABLE 4-continued

| Category | Component | | | | | | | | | | |
|---|---|---|---|---|---|---|---|---|---|---|---|
| Surfactant | Olfine E1010 | 0.5 | 0.5 | 0.5 | 0.5 | 0.5 | 0.5 | 0.5 | 0.5 | 0.5 | 0.5 |
| | BYK348 | 0.3 | 0.3 | 0.3 | 0.3 | 0.3 | 0.3 | 0.3 | 0.3 | 0.3 | 0.3 |
| Polymer Particles | Polymer Particles 1 | | | | | | | | | | |
| | Polymer Particles 2 | | | | | | | | | | |
| | Polymer Particles 3 | | | | | | | | | | |
| | Polymer Particles 4 | | | | | | | | | | |
| | Polymer Particles 5 | 3 | 3 | 5 | 5 | 3 | | | | | |
| Resin Emulsion | Joncryl 7100 | | | | | | | | | | |
| | Joncryl 7610 | | | | | | 3 | 3 | 5 | 5 | 3 |
| | Ion Exchange Water | Remainder | Remainder | Remainder | Remainder | Remainder | Remainder | Remainder | Remainder | Remainder | Remainder |
| Surface Temperature (° C.) of Recording Medium | | | | 70 | | | | | 70 | | |
| Abrasion Resistance: single color | | C | C | C | C | C | D | D | D | D | D |
| Abrasion Resistance: plural colors | | | | B | | | | | C | | |
| Discharge Stability | | C | C | C | C | C | A | A | A | A | A |
| Clogging Recovery | | C | C | C | C | C | D | D | D | D | D |

| | | Comparative Example 3 | | | | |
|---|---|---|---|---|---|---|
| | Ink Set | C | M | Lm | Lc | W |
| Pigment | Cyan Pigment | 3 | | | 0.5 | |
| | Magenta Pigment | | 3 | 0.5 | | |
| | White Pigment | | | | | 10 |
| Moisturizer | 1,2-hexanediol | 3 | 3 | 3 | 3 | 3 |
| | Propylene glycol | 5 | 5 | 5 | 5 | 5 |
| Cyclic Amide Compound | 2-pyrrolidone | 5 | 5 | 5 | 5 | 5 |
| Surfactant | Olfine E1010 | 0.5 | 0.5 | 0.5 | 0.5 | 0.5 |
| | BYK348 | 0.3 | 0.3 | 0.3 | 0.3 | 0.3 |
| Polymer Particles | Polymer Particles 1 | | | | | |
| | Polymer Particles 2 | | | | | |
| | Polymer Particles 3 | | | | | |
| | Polymer Particles 4 | | | | | |
| | Polymer Particles 5 | | | | | |
| Resin Emulsion | Joncryl 7100 | 3 | 3 | 5 | 5 | 3 |
| | Joncryl 7610 | | | | | |
| | Ion Exchange Water | Remainder | Remainder | Remainder | Remainder | Remainder |
| Surface Temperature (° C.) of Recording Medium | | | | | 70 | |
| Abrasion Resistance: single color | | C | C | C | C | C |
| Abrasion Resistance: plural colors | | | | | B | |
| Discharge Stability | | A | A | A | A | A |
| Clogging Recovery | | D | D | D | D | D |

TABLE 5

| | | Example 6 | | | | | Example 7 | | | | |
|---|---|---|---|---|---|---|---|---|---|---|---|
| | Ink Set | C | M | Lm | Lc | W | C | M | Lm | Lc | W |
| Pigment | Cyan Pigment | 3 | | | 0.5 | | 3 | | | 0.5 | |
| | Magenta Pigment | | 3 | 0.5 | | | | 3 | 0.5 | | |
| | White Pigment | | | | | 10 | | | | | 10 |
| Moisturizer | 1,2-hexanediol | 3 | 3 | 3 | 3 | 3 | 3 | 3 | 3 | 3 | 3 |
| | Propylene glycol | 5 | 5 | 5 | 5 | 5 | 5 | 5 | 5 | 5 | 5 |
| Cyclic Amide Compound | 2-pyrrolidone | 5 | 5 | 5 | 5 | 5 | 5 | 5 | 5 | 5 | 5 |
| Surfactant | Olfine E1010 | 0.5 | 0.5 | 0.5 | 0.5 | 0.5 | 0.5 | 0.5 | 0.5 | 0.5 | 0.5 |
| | BYK348 | 0.3 | 0.3 | 0.3 | 0.3 | 0.3 | 0.3 | 0.3 | 0.3 | 0.3 | 0.3 |
| Polymer Particles | Polymer Particles 1 | 3 | 3 | 5 | 5 | 3 | | | | | |
| | Polymer Particles 2 | | | | | | 3 | 3 | 5 | 5 | 3 |
| | Polymer Particles 3 | | | | | | | | | | |
| | Polymer Particles 4 | | | | | | | | | | |
| Resin Emulsion | Joncryl 7100 | | | | | | | | | | |
| | Joncryl 7610 | | | | | | | | | | |

TABLE 5-continued

| | | | | | | | | | | | |
|---|---|---|---|---|---|---|---|---|---|---|---|
| Ion Exchange Water | | Remainder | Remainder | Remainder | Remainder | Remainder | Remainder | Remainder | Remainder | Remainder | Remainder |
| Surface Temperature (° C.) of Recording Medium | | | | 45 | | | | | | 30 | |
| Quick Drying Properties | | A | A | A | A | A | B | B | B | B | B |
| Discharge Stability | | A | A | A | A | A | A | A | A | A | A |

| | | | Example 8 | | | | |
|---|---|---|---|---|---|---|---|
| | Ink Set | | C | M | Lm | Lc | W |
| Pigment | Cyan Pigment | | 3 | | | 0.5 | |
| | Magenta Pigment | | | 3 | 0.5 | | |
| | White Pigment | | | | | | 10 |
| Moisturizer | 1,2-hexanediol | | 3 | 3 | 3 | 3 | 3 |
| | Propylene glycol | | 5 | 5 | 5 | 5 | 5 |
| Cyclic Amide Compound | 2-pyrrolidone | | 5 | 5 | 5 | 5 | 5 |
| Surfactant | Olfine E1010 | | 0.5 | 0.5 | 0.5 | 0.5 | 0.5 |
| | BYK348 | | 0.3 | 0.3 | 0.3 | 0.3 | 0.3 |
| Polymer Particles | Polymer Particles 1 | | | | | | |
| | Polymer Particles 2 | | 3 | 3 | 5 | 5 | 3 |
| | Polymer Particles 3 | | | | | | |
| | Polymer Particles 4 | | | | | | |
| Resin Emulsion | Joncryl 7100 | | | | | | |
| | Joncryl 7610 | | | | | | |
| | Ion Exchange Water | | Remainder | Remainder | Remainder | Remainder | Remainder |
| | Surface Temperature (° C.) of Recording Medium | | | | | 45 | |
| | Quick Drying Properties | | A | A | A | A | A |
| | Discharge Stability | | B | B | B | B | B |

What is claimed is:

1. An ink composition that performs recording by being attached on a non-absorbent recording medium or a low absorbency recording medium that is heated to a temperature in the range of 30° C. to 60° C., the ink composition comprising:
a pigment;
a urethane resin emulsion; and
polymer particles,
wherein the polymer particles include a core polymer and a shell polymer that covers at least a portion of the core polymer,
a glass transition point of the polymer that configures the core polymer is more than 10° C. lower than the glass transition point of the polymer that configures the shell polymer, and the glass transition point of the polymer that configures the shell polymer is higher than 40° C.,
the polymer that configures the shell polymer includes a polymer having a (meth)acrylate monomer unit and a carboxylic acid monomer unit,
the content (solid content conversion) of the polymer particles is 3.0 mass % or more with respect to the total amount of the ink composition, and
the glass transition point of the resin that configures the core portion is in the range of −10° C. to 60° C.

2. The ink composition according to claim 1, wherein the polymer that configures the shell polymer includes 20 mass % or more of a repeating unit derived from a hydrophilic monomer, and includes 10 mass % or more of a repeating unit derived from a hydrophobic monomer.

3. An ink set comprising:
a light ink composition that is the ink composition according to claim 2, in which the content of pigment included in the ink composition is less than 0.8 mass % with respect to the total amount of the ink composition, and
a dark ink composition that is the ink composition according to claim 2, in which the content of the pigment included in the ink composition is 0.8 mass % or more with respect to the total amount of the ink composition.

4. The ink composition according to claim 1, wherein the content of the (meth)acrylate monomer unit and the carboxylic acid monomer unit in the polymer that configures the shell polymer is 30 mass % or more with respect to the total amount of the polymer that configures the shell polymer.

5. An ink set comprising:
a light ink composition that is the ink composition according to claim 4, in which the content of pigment included in the ink composition is less than 0.8 mass % with respect to the total amount of the ink composition, and
a dark ink composition that is the ink composition according to claim 4, in which the content of the pigment included in the ink composition is 0.8 mass % or more with respect to the total amount of the ink composition.

6. The ink composition according to claim 1, wherein a mass ratio (c/s) of the mass of the core polymer (c) and the mass of the shell polymer (s) is in the range of 0.40 to 4.0, and
the ratio ((c/s)φ) of the average particle diameter φ (unit: nm) of the polymer particles and the mass ratio (c/s) is 0.010 or more.

7. An ink set comprising:
a light ink composition that is the ink composition according to claim 6, in which the content of pigment included in the ink composition is less than 0.8 mass % with respect to the total amount of the ink composition, and
a dark ink composition that is the ink composition according to claim 6, in which the content of the pigment included in the ink composition is 0.8 mass % or more with respect to the total amount of the ink composition.

8. The ink composition according to claim 1, wherein the content of the polymer particles is in the range of 3.0 mass % to 20 mass % with respect to the total amount of the ink composition.

9. An ink set comprising:

a light ink composition that is the ink composition according to claim 8, in which the content of pigment included in the ink composition is less than 0.8 mass % with respect to the total amount of the ink composition, and a dark ink composition that is the ink composition according to claim 8, in which the content of the pigment included in the ink composition is 0.8 mass % or more with respect to the total amount of the ink composition.

10. The ink composition according to claim 1, wherein the acid value of the polymer that configures the core polymer is 0 mgKOH/g, and the acid value of the polymer that configures the shell polymer is 20 mgKOH/g or more.

11. An ink set comprising:

a light ink composition that is the ink composition according to claim 10, in which the content of pigment included in the ink composition is less than 0.8 mass % with respect to the total amount of the ink composition, and a dark ink composition that is the ink composition according to claim 10, in which the content of the pigment included in the ink composition is 0.8 mass % or more with respect to the total amount of the ink composition.

12. The ink composition according to claim 1, wherein the polymer that configures the core polymer includes 80 mass % or more of a polymer having a hydrophobic monomer unit, and the polymer that configures the shell polymer includes a polymer having a methyl (meth)acrylate monomer unit or an ethyl (meth)acrylate monomer unit.

13. The ink composition according to claim 1, wherein the gel fraction due to tetrahydrofuran of the polymer that configures the core polymer and the polymer that configures the shell polymer is 10% or less.

14. The ink composition according to claim 1, wherein the content of the pigment is less than 0.8 mass % with respect to the total amount of the ink composition.

15. An ink set comprising:

a light ink composition that is the ink composition according to claim 1, in which the content of pigment included in the ink composition is less than 0.8 mass % with respect to the total amount of the ink composition, and a dark ink composition that is the ink composition according to claim 1, in which the content of the pigment included in the ink composition is 0.8 mass % or more with respect to the total amount of the ink composition.

16. A recording method comprising:

heating a non-absorbent recording medium or a low-absorbency recording medium to a temperature in the range of 30° C. to 60° C., and discharging the ink composition according to claim 1 and attaching the ink composition on the non-absorbent recording medium or low absorbency recording medium.

* * * * *